United States Patent [19]

Ismail

[11] Patent Number: 4,608,325

[45] Date of Patent: Aug. 26, 1986

[54] ANODE BINDERS FOR ELECTROCHEMICAL CELLS

[75] Inventor: Mohamed I. Ismail, Mississauga, Canada

[73] Assignee: Duracell Inc., Bethel, Conn.

[21] Appl. No.: 539,438

[22] Filed: Oct. 6, 1983

[51] Int. Cl.⁴ .................. H01M 4/62; H01M 4/42
[52] U.S. Cl. ..................... 429/217; 252/182.1; 429/190; 429/229; 429/230
[58] Field of Search ............... 429/190, 217, 229, 230; 252/182.1

[56] References Cited

U.S. PATENT DOCUMENTS

| | | | |
|---|---|---|---|
| 3,023,262 | 2/1962 | Emmerling et al. | 429/217 |
| 3,048,549 | 8/1962 | Adams | 429/190 X |
| 3,970,476 | 7/1976 | Cerfon | 429/224 X |
| 4,260,669 | 4/1981 | Kerg | 429/229 X |
| 4,281,047 | 7/1981 | Danzig | 429/230 X |
| 4,288,913 | 9/1981 | Parsen et al. | 429/190 X |

FOREIGN PATENT DOCUMENTS 110033  9/1978  Japan .................. 429/190

Primary Examiner—Brian E. Hearn
Assistant Examiner—Stephen J. Kalafut
Attorney, Agent, or Firm—Ronald S. Cornell

[57] ABSTRACT

A blend of powders to be used in gelled anodes of electrochemical cells contains oil binders comprised of liquid petrolatum or halocarbon, particularly fluorocarbon, oils. Such binders maintain homogeneity of the powdered anode blends even under adverse storage and transporting conditions.

1 Claim, No Drawings

ANODE BINDERS FOR ELECTROCHEMICAL CELLS

This invention relates to binders for the powder mixtures which are used to form gelled anodes in electrochemical cells and particularly such binders for gelled zinc anodes in alkaline cells.

It has been the practice in cells containing powdered anodes to gel or thicken such anodes with gelling or thickening agents such as carboxymethyl cellulose (CMC), starch graft copolymers (SGP), Xanthan gum, guar gum, polyacrylates, cross linked polyacrylates, and the like. Such gelling or thickening provides for enhanced dispersal of the active anode materials, such as zinc and, as a result, more effective discharge is attained because of the greater exposed surface area of the powdered anode material.

Homogeneity of the mixture of the anode powder and the gelling agent is highly desirable prior to and during the gelling of the anode in order to provide the most uniform dispersal and hence most effective gelled anode. To provide for such maintenance of homogeneity, materials such as glycerin as well as other polyhydric alcohols have been utilized in conjunction with the gelling agent and anode powder blends, as more fully described in U.S. Pat. No. 4,288,913. Such materials effectively function as binders to uniformly adhere the gelling agent to the anode powder during gelling thereof. However, anode powder blends (anode powder and powdered gelling agent) made with such materials may be subject to some detrimental processing effects which may hinder effective large scale production. For example, large quantities of anode powder blends may be prepared and transported to cell manufacturing sites. However, powder blends having glycerin binders or no binders at all tend to lose powder homogeneity under conditions of vibration and temperature changes with resultant formation of unwanted dust and separation of anode material of various mesh sizes. In this regard it is noted that anode material powders of a particular particle size are actually mixtures of particles having an average particle size. In a finished cell it is highly desireable to maintain a homogeneous mixture of the particles of the various sizes in order that the anode be uniformly disposed against the cathode for optimum cell performance. Various conditions, particularly vibration during transport may cause separation of the particles of various sizes with the heavier particles tending to settle to the bottom.

It is an object of the present invention to provide novel binding materials for use in gelled anodes which maintain homogeneity of the anode powder blend during storage and transport as well as during gelling and in the finished cells.

This and other objects, features and advantages of the present invention will become more evident from the following discussion.

Generally the present invention comprises a novel anode blend for an electrochemical cell, and the electrochemical cell having such blend in the form of a gelled or thickened anode. The anode blend contains a liquid binder comprised of petrolatum (mineral oil) or halocarbon oils which is utilized to maintain stability and homogeneity of the anode during the gelling procedure. For efficient manufacturing procedures large quantities of the powdered anode material (anode blend) comprising the active anode powder material (generally preamalgamated), the gelling agent, and the homogeneity maintaining binder, are initially prepared for later use in forming the anode. The most common active anode powder material utilized is zinc which is initially prepared for utilization in alkaline cells by amalgamation thereof with mercury (to reduce in-cell gassing of the zinc). The amalgamated zinc is then admixed with the binder and the gelling agent material. Such anode blend preparation, at times, is effected at a place remote from the cell assembly site. As a result, the anode blend must be transported with it being thereby subjected to continued vibration and temperature changes.

With the specific oil binders of the present invention, dust formation and separation of anode powder particles is reduced during such transportation when compared to anode powder blends containing the glycerin or polyhydric alcohol binders of the prior art. Additionally, performance of the cells containing gelled anodes with the oil binders of the present invention is as least as good as or better than that of cells having the polyhydric alcohol binders of the prior art.

Additional advantages of the oil binder of the present invention over that of the polyhydric alcohols of the prior art include the facts that anode powder blends do not cake under conditions of vibration and powder flow is enhanced.

For effective utilization the amount of oil binder added to the anode blend should be at least about 0.02% by weight to a maximum of about 0.2%. A preferred range is between about 0.05 to about 1.5 by weight. Additions in such amounts are sufficient for uniformly coating the particles in the anode blend for binding action without being excessive with resultant coagulation of the particles.

Active anode powder materials, in addition to the preferred zinc, include aluminum, cadmium, calcium, copper, indium, iron, lead, magnesium, manganese, nickel, tin and the like. A preferred average particle size range for such anode materials, for effective cell utilization, ranges from 0.03 to 0.9 mm in diameter. Particle sizes may however vary depending upon the desired drain rate, cell configuration and the like.

The oil binders of the present invention include liquid petrolatum (mineral oil both light and heavy), and halocarbon, particularly fluorocarbon, oils. The mineral oils are liquid paraffins or hydrocarbons having various chain lengths which may be branched or alocyclic. Typical commercially available mineral oils which are useful in this invention have about "$C_{30}$" average chain length. Average chain length may however vary from $C_{10}$ to $C_{40}$. Commercially available heavy mineral oil (USP 350 RAMOL) has the average characteristics of 0.88 to 0.895 gm/cc density (room temperature), a pour point of about $-18°$ C., a viscosity of about 66.3 to 68.7 cps at 40°, and a flash point of about 216° C. Commercially available light mineral oil (USP 250 RAMOL) has the average characteristics of 0.871 to 0.88 gm/cm density (room temperature), a pour point of about $-9°$ C., a viscosity of about 38.4 to 40.7 cps at 40° C., and a flash point of about 193° C. For mineral oils generally the viscosity is between about 20–80 cps (at about 40° C.) and the density is between about 0.8 to 0.9 gm/cc at room temperature.

Examples of halocarbon oils include the fluorocarbon oils such as cis and trans perfluorodecalin and mixed chlorofluorocarbons having repeating units of $-(CF_2CFCl)_n-$ which are available from ISC Chemicals Ltd. (UK) as Flutec Liquid (Flutec PP5) and Halocarbon Corp. (USA) as Halocarbon Oils Series 4.2 and 1.8, respectively. For halocarbons generally they must be liquid at room temperature and have a viscosity between about 0.7 and 7 centistokes at about 40° C. with a density of between about 1.7 to 1.9 gm/cc at room temperature.

The binder oils of the present invention form a thin adherent film or layer on the surface of the anode metal particles and/or on the particles of the gelling agent in the same manner as the polyhydric alcohols of the prior art. However, significantly less of the present binder oils are required to effect film or layer formation.

The gelling agents utilized in conjunction with the binder oils of the present invention include those commonly utilized as described above with the starch graft copolymer gelling agents being preferred.

The binder oils of the present invention are utilized by homogeneous admixture with powdered active anode metals and the gelling agent and mixture thereafter with a liquid to effect the gelling action. Preferably the liquid is the cell electrolyte such as alkaline electrolyte solutions of sodium or potassium hydroxide used in alkaline type batteries or acid solutions such as those used in zinc-carbon or lead acid battery systems.

The gelling liquid may be added directly after the anode metal, gelling agent and binder oil have been mixed or after a period of storage or transportation. In the latter instance the beneficial effects of the binder oil are evident when compared to the polyhydric alcohols of the prior art. The gelling liquid may be added to the anode blend outside of the cell (pregel) with the resultant gelled anode being dispensed into the cell container or alternatively the dry anode blend may be poured into the cell container having the gelling liquid, e.g. electrolyte already contained therein to effect in situ gelling of the anode.

Additional additives such as dextrin and surfactants may be added to the anode blend to aid in fluid absorption and the like if so desired. Addition of dextrin preferably should not exceed about 0.02%.

The binder oils of the present invention are relatively stable with cell components generally and may be utilized in cells having various cathode materials particularly the commonly utilized metal oxides, such as cadmium oxide, mercury oxide, manganese dioxide, silver oxide and peroxide, lead oxide and nickel oxide.

In order to more fully illustrate the utilization and efficacy of the present invention the following examples are presented. It is understood however that such examples are for illustrative purposes and accordingly details contained therein are not to be construed as being limitations on the present invention. Unless otherwise indicated all parts are parts by weight.

EXAMPLE 1

An anode blend is made of amalgamated powder zinc (7% Hg) with an average particle size of about 70 micrometers and 1% Waterlock gelling agent (a starch graft copolymer of Grain Processing Corp.). To this blend is added 0.1% heavy mineral oil as a binder and the blend is thoroughly mixed. The resultant material is aged for 15 weeks at ambient temperature and then for about 18 hours at 55° C. and is then vibrated for about 90 minutes. The material remains powdery and flowable.

EXAMPLE 2 (PRIOR ART)

An anode blend is made as in Example 1 but with 0.2% glycerine binder. The blend is subjected to the same conditions as in Example 1 and forms a non flowing hard cake.

EXAMPLES 3-6 (COMPARATIVE)

Anode blends are made as in Examples 1 & 2 but with 1.4% Waterlock and are aged for 5 weeks at ambient temperature (21° C.) The blends are then subjected to simulated transport conditions of 90 minutes vibration followed by storage at 55° C. for 17 hours and then 60 minutes vibration. The powders are then sieve analyzed for % fines (−100 mesh) and the ratio of fines to coarse (+100 mesh) with the results given in the Table below.

Anode blends are made as in Examples 1 & 2 respectively but with 0.07% of the heavy mineral oil being used. The blends are then aged for 3 weeks at ambient temperature (21° C.) and thereafter subjected to 90 minute vibration followed by storage for 17 hours at 55° C. and then 60 minute vibration. The powders are then sieve analyzed for % fines (−100 mesh) and the ratio of fines to coarse (+100 mesh) with the results given in the Table below.

TABLE

| EXAMPLE # | BINDER TYPE | % WT BINDER | % FINES | RATIO F/C |
|---|---|---|---|---|
| 3 | mineral oil | 0.10 | 36.60 | 0.57 |
| 4 (prior art) | glycerine | 0.20 | 40.01 | 0.62 |
| 5 | mineral oil | 0.07 | 23.05 | 0.30 |
| 6 (prior art) | glycerine | 0.20 | 27.34 | 0.37 |

*0.20% is an effective amount for the glycerine binder

It is evident from the above examples that anode powder handling is facilitated with the use of the binder oils of the present invention and that such binders, under transport conditions, maintain a greater degree of particle homogeneity than that of the prior art.

EXAMPLES 7-14 (COMPARATIVE)

Eight AA size cells are made with anode blends as in Examples 1 & 2 (four of each). Each cell contains 2.6 gms of anode material, 2 cc of 34% KOH electrolyte solution and a manganese dioxide cathode. Prior to use within the cells the anode blends are stored for 2 weeks at 21° C., for 2 weeks at 55° C., for 4 weeks at 55° C., and for 1 week at 71° C. (one of each blend under each condition). The cells are discharged with a load of 25 ohms. The cells having the mineral oil binders consistently provide improved performance compared to those having the glycerin binders.

The above examples illustrate the efficacy of the oil binder of the present invention under storage conditions alone. Under conditions of storage and transport (vibration) the advantages of the binder oil is enhanced.

It is understood that the above examples are for illustrative purposes and that changes in anode blend components as well as other cell components including materials, ratios, steps and sequence of preparation and the like may be made without departing from the scope of the present invention as defined in the following claims.

What is claimed is:

1. An electrochemical cell comprised of an alkaline electrolyte, a manganese dioxide cathode and a gelled anode comprised of mercury amalgamated zinc, a starch graft copolymer gelling agent and a liquid petrolatum binder in amounts between 0.02% to 0.2% by weight thereof.

* * * * *